United States Patent
Cheng

(10) Patent No.: US 11,097,803 B2
(45) Date of Patent: Aug. 24, 2021

(54) SHOCK ABSORBING AND HEIGHT ADJUSTING STRUCTURE

(71) Applicant: Kai-Han Cho, Taichung (TW)

(72) Inventor: Chih-Cheng Cheng, Taichung (TW)

(73) Assignee: Kai-Han Cho, Taichung (TW)

( * ) Notice: Subject to any disclaimer, the term of this patent is extended or adjusted under 35 U.S.C. 154(b) by 168 days.

(21) Appl. No.: 16/667,931

(22) Filed: Oct. 30, 2019

(65) Prior Publication Data

US 2020/0130775 A1 Apr. 30, 2020

(30) Foreign Application Priority Data

Oct. 30, 2018 (TW) .................... 107214758
Nov. 13, 2018 (TW) .................... 107215411
Apr. 22, 2019 (TW) .................... 108204955

(51) Int. Cl.
*B62K 25/08* (2006.01)
*B62K 25/04* (2006.01)

(52) U.S. Cl.
CPC .............. *B62K 25/08* (2013.01); *B62K 25/04* (2013.01); *B62K 2025/045* (2013.01)

(58) Field of Classification Search
CPC .. B62K 25/08; B62K 25/24; B62K 2025/045; B60N 2/16; B60N 2/50
See application file for complete search history.

(56) References Cited

U.S. PATENT DOCUMENTS

| | | | | |
|---|---|---|---|---|
| 9,004,500 | B2* | 4/2015 | Murakami | B62K 25/08 280/5.514 |
| 2003/0001358 | A1* | 1/2003 | Becker | B62K 25/06 280/276 |
| 2010/0294605 | A1* | 11/2010 | Mochizuki | F16F 9/432 188/297 |
| 2012/0068436 | A1* | 3/2012 | Powell | F16B 7/10 280/283 |
| 2014/0262653 | A1* | 9/2014 | Galasso | F16F 9/3278 188/313 |
| 2016/0311498 | A1* | 10/2016 | Bossard | B62K 25/06 |
| 2017/0334503 | A1* | 11/2017 | Sintorn | F16F 9/3257 |
| 2018/0334220 | A1* | 11/2018 | Walthert | F16F 9/48 |
| 2019/0111993 | A1* | 4/2019 | Krefting | B62K 25/08 |

* cited by examiner

*Primary Examiner* — Tony H Winner
(74) *Attorney, Agent, or Firm* — CKC & Partners Co., LLC

(57) ABSTRACT

A shock absorbing and height adjusting structure includes an inner tube, a lower piston assembly and an upper piston assembly. The inner tube includes an upper end, a lower end opposite to the upper end, and an inner space for accommodating a gas. The lower piston assembly includes a lower piston movably inserted into the inner tube, and a lower passage disposed at the lower piston. The upper piston assembly includes an upper piston movably inserted into the inner tube. When the lower passage is opened, the lower piston is moved relative to the lower end, and when the upper piston is forced, the upper piston has movement relative to the upper end toward the lower end to compress the gas.

16 Claims, 15 Drawing Sheets

SHOCK ABSORBING AND HEIGHT ADJUSTING STRUCTURE

RELATED APPLICATIONS

This application claims priority to Taiwan Application Serial Number 107214758, filed Oct. 30, 2018, Taiwan Application Serial Number 107215411, filed Nov. 13, 2018, and Taiwan Application Serial Number 108204955, filed Apr. 22, 2019, which are herein incorporated by reference.

BACKGROUND

Technical Field

The present disclosure relates to a height adjusting structure. More particularly, the present disclosure relates to a shock absorbing and height adjusting structure having shock absorbing function.

Description of Related Art

Generally, the height of a bicycle seat can be adjusted. A bicycle can include a seat tube and a seat post. The bicycle seat is disposed at the seat post, and the height of the bicycle seat can be adjusted through movement between the seat tube and the seat post.

In conventional arts, a C-shaped ring is used to secure the seat tube and the seat post. However, the seat tube and the seat post are easily releasable by such conventional securing way, and the reliability thereof is not enough. Hence, an oil-gas adjusting mechanism which includes an inner tube is developed. The inner tube is disposed within the seat tube and is connected to the seat post. A gas and an oil are accommodated within the inner tube, and a valve is applied to change a position of a piston inside the inner tube, thereby changing the height of the seat post relative to the seat tube.

However, the shock absorbing function is not considered by the abovementioned structures. Therefore, a shock absorbing and height adjusting structure including the shock absorbing function as well as the height adjusting function is needed, which can be widely used in many fields, such as a bicycle field and an office chair field.

SUMMARY

According to one aspect of the present disclosure, a shock absorbing and height adjusting structure including an inner tube, a lower piston assembly and an upper piston assembly is provided. The inner tube includes an upper end, a lower end opposite to the upper end, and an inner space for accommodating a gas. The lower piston assembly includes a lower piston movably inserted into the inner tube, and a lower passage disposed at the lower piston. The upper piston assembly includes an upper piston movably inserted into the inner tube. When the lower passage is opened, the lower piston is moved relative to the lower end, and when the upper piston is forced, the upper piston is moved relative to the upper end toward the lower end so as to compress the gas.

According to another aspect of the present disclosure, a shock absorbing and height adjusting structure including an inner tube, an upper piston assembly and a lower piston assembly is provided. The inner tube includes an upper tube body and a lower tube body. The upper tube body includes an upper end and a first connecting end opposite to the upper end. The lower tube body includes a lower end and a second connecting end opposite to the lower end, and the second connecting end is connected to the first connecting end. The upper piston assembly includes an upper piston movably inserted into the upper tube body, and an upper passage disposed at the upper piston. The lower piston assembly includes a lower piston movably inserted into the lower tube body, and a lower passage disposed at the lower piston. When the upper passage is opened and the lower passage is closed, the upper piston is moved relative to the upper end while a position of the lower piston relative to the lower end is fixed. When the lower passage is opened and the upper passage is closed, the lower piston is moved relative to the lower end while a position of the upper piston relative to the upper end is fixed. When the upper piston is forced, the upper piston has movement relative to the upper end toward the lower end to compress the gas.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as be "directly disposed on", "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
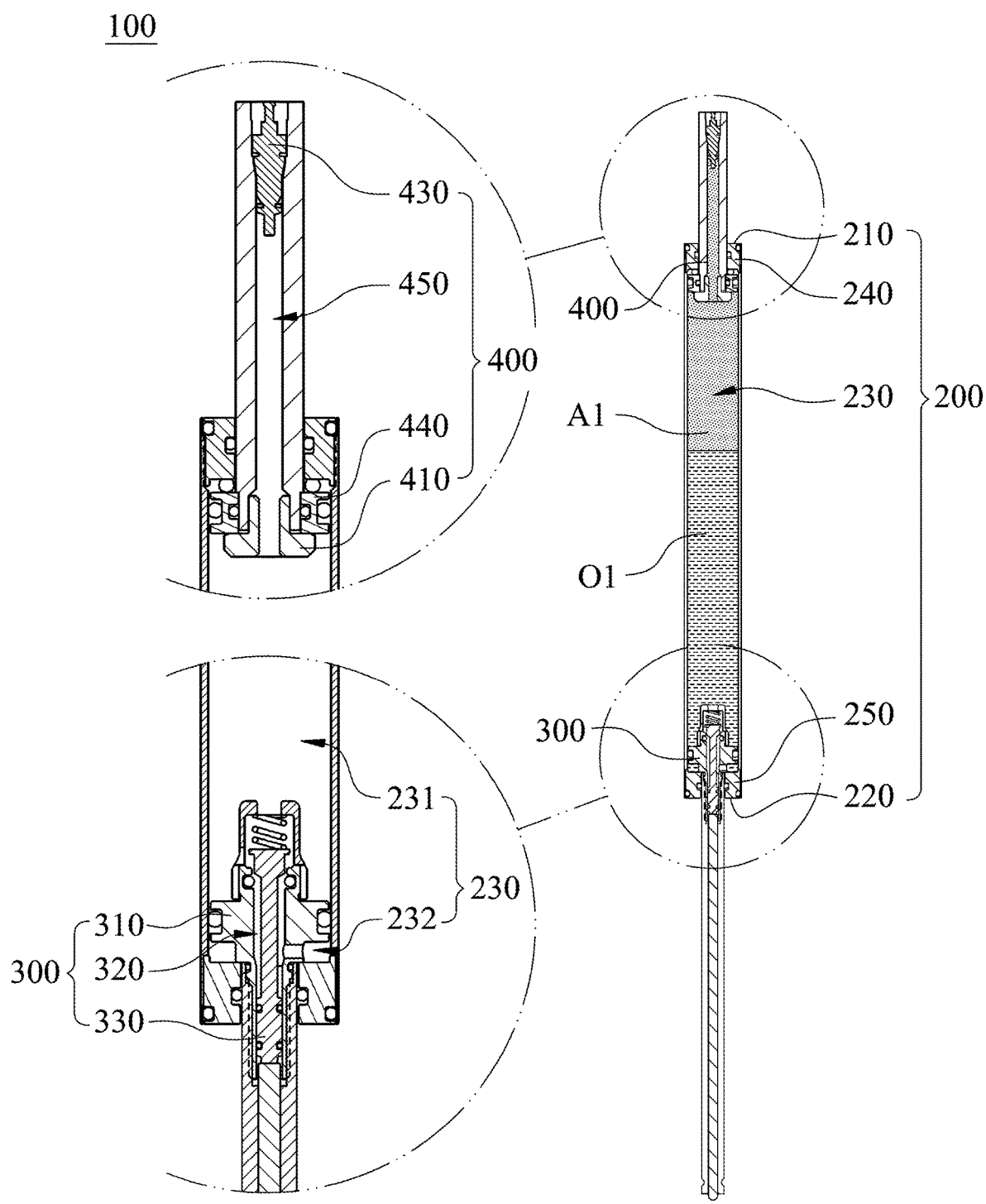
FIG. 1 shows one cross-sectional view of a shock absorbing and height adjusting structure according to a first embodiment of the present disclosure.
Figure 2:
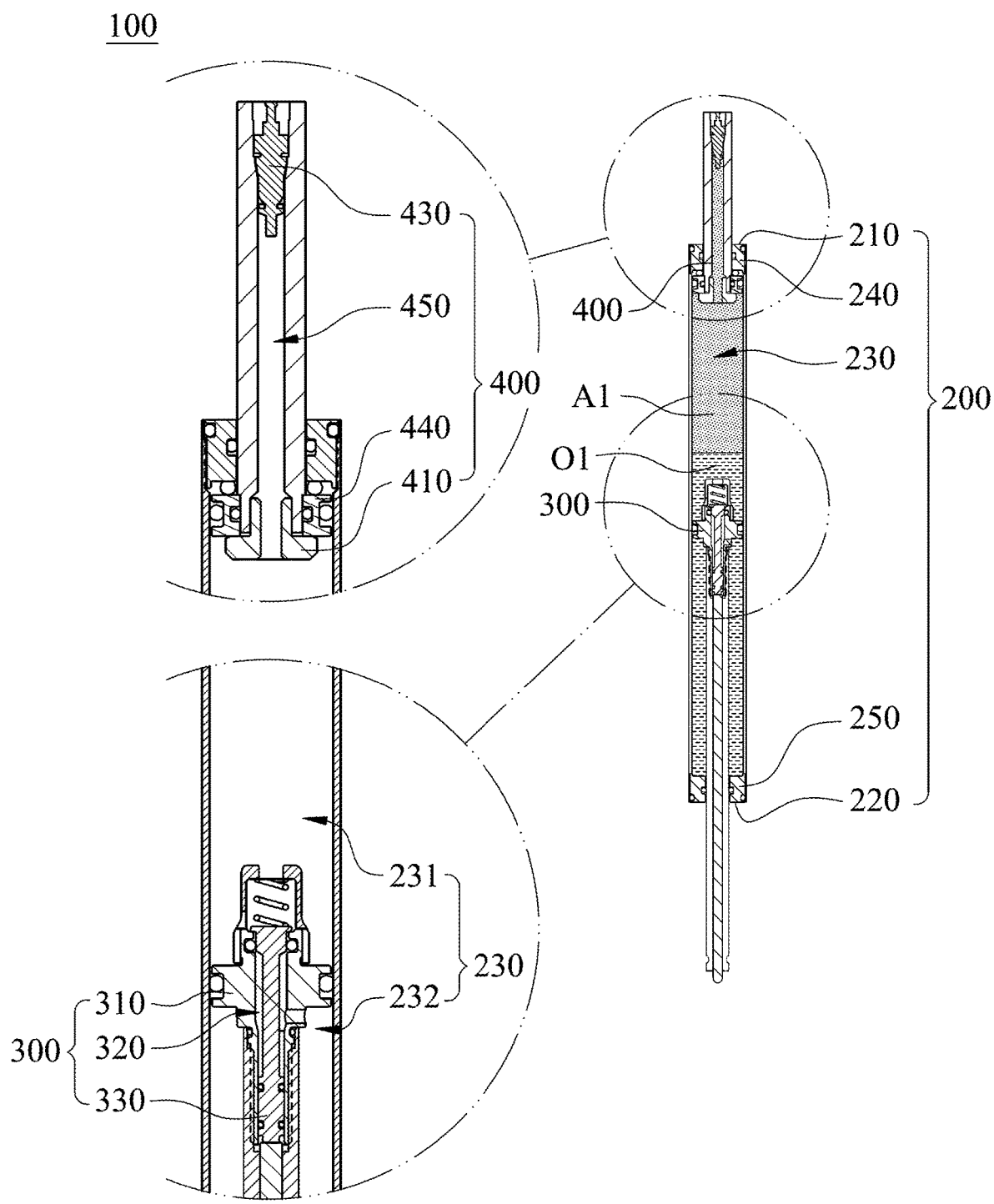
FIG. 2 shows another cross-sectional view of the shock absorbing and height adjusting structure of FIG. 1.
Figure 3:
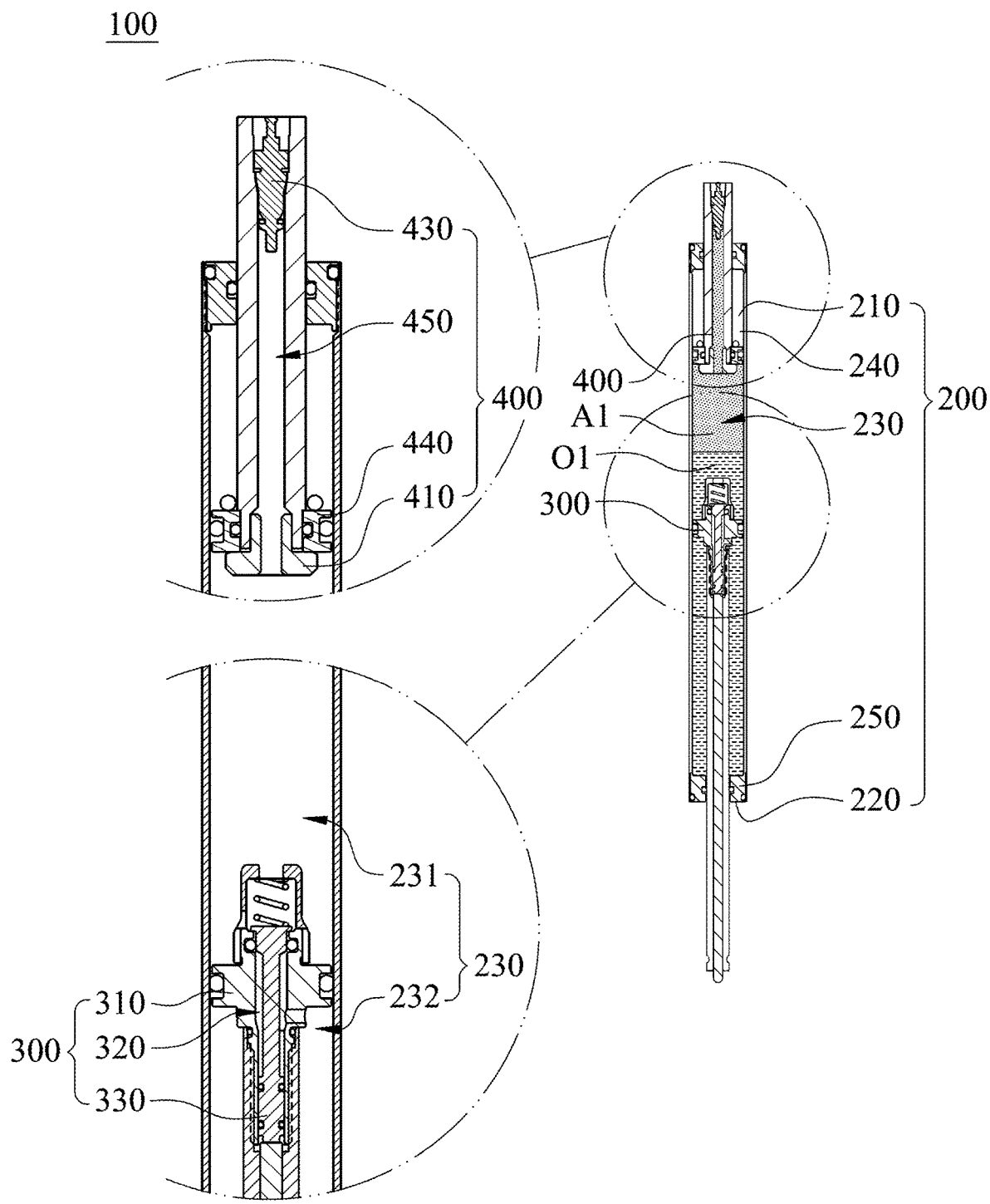
FIG. 3 shows yet another cross-sectional view of the shock absorbing and height adjusting structure of FIG. 1.

FIG. 1 shows one cross-sectional view of a shock absorbing and height adjusting structure 100 according to a first embodiment of the present disclosure. FIG. 2 shows another cross-sectional view of a shock absorbing and height adjusting structure 100 of FIG. 1. FIG. 3 shows yet another cross-sectional view of a shock absorbing and height adjusting structure 100 of FIG. 1. The shock absorbing and height adjusting structure 100 includes an inner tube 200, a lower piston assembly 300 and an upper piston assembly 400.

The inner tube 200 includes an upper end 210, a lower end 220 opposite to the upper end 210, and an inner space 230 for accommodating a gas A1. The lower piston assembly 300 includes a lower piston 310 movably inserted into the inner tube 200, and a lower passage 320 disposed at the lower piston 310. The upper piston assembly 400 includes an upper piston 410 movably inserted into the inner tube 200. When the lower passage 320 is opened, the lower piston 310 is moved relative to the lower end 220, and when the upper piston 410 is forced, the upper piston 410 is moved relative to the upper end 210 toward the lower end 220 to compress the gas A1.

Therefore, when the upper piston 410 is forced, the upper piston 410 can compress the gas A1 owing to that the gas A1 is compressible; as a result, the shock can be absorbed. The details of the shock absorbing and height adjusting structure 100 will be described in the following paragraphs.

The inner tube 200 is hollow and has the inner space 230. The inner tube 200 can further include an upper sealing cover 240 and a lower sealing cover 250. The upper sealing cover 240 is covered on the upper end 210 of the inner tube 200 and has a bore (not labeled) configured to allow the upper piston 410 to insert into the inner space 230. The lower sealing cover 250 is covered on the lower end 220 of the inner tube 200 and has a bore (not labeled) configured to allow the lower piston 310 to insert into the inner space 230. The inner space 230 can be separated into a first chamber 231 and a second chamber 232 by the lower piston 310. The inner space 230 can further accommodate an oil O1. The gas A1 and one part of the oil O1 can be accommodated in the first chamber 231, and the other part of the oil O1 can be accommodated in the second chamber 232.

The lower piston assembly 300 can further include a lower controlling bar 330 disposed at the lower piston 310 for opening or closing the lower passage 320. In detail, the lower controlling bar 330 can be switched between a first position and a second position along an axis of the inner tube 200. When the lower controlling bar 330 is in the first position, the lower passage 320 is closed such that the oil O1 cannot flow from the first chamber 231 to the second chamber 232 or from the second chamber 232 to the first chamber 231. On the contrary, when the lower controlling bar 330 is in the second position, the lower passage 320 is opened such that the oil O1 can flow from the first chamber 231 to the second chamber 232 or from the second chamber 232 to the first chamber 231.

Hence, as shown in FIG. 1, the lower passage 320 is not closed by the lower controlling bar 330, and the oil O1 can flow from the first chamber 231 to the second chamber 232; as a result, the lower piston 310 can be moved relative to the lower end 220. When the lower passage 320 is closed by the lower controlling bar 330, as shown in FIG. 2, the position of the lower piston 310 relative to the lower end 220 is fixed.

The upper piston 410 can include a pushing end (not labeled) protruding into the inner space 230, particularly, protruding into the first chamber 231 to contact the gas A1. As shown in FIG. 3, when the upper piston 410 is forced, especially forced by an axial force, the pushing end will be moved toward the lower end 220 to compress the gas A1, and the pressure of the compressed gas A1 becomes larger owing to the reduced volume. As long as the pressure of the compressed gas A1 is equal to the axial forced loaded on the upper piston 410, the pushing end stop moving. After the axial forced is removed, the pressure of the gas A1 is released and the pushing end is restored. During the compressing process, the pressure of the gas A1 becomes lager, which results in lowering of the movement of the upper piston 410 to absorb the shock.

The upper piston assembly 400 can include the gas channel 450 which is located inside the upper piston 410 and is communicated with the inner space 230. The gas A1 is allowed to flow through the gas channel 450 to adjust an amount of the gas A1 inside the inner space 230. To be more specific, an original amount of the gas A1 inside the inner space 230 is V1, and if more gas A1 is allowed to flow into the inner chamber 230 through the gas channel 450, the amount of the gas A1 inside the inner space 230 will become V2. When the amount of the gas A1 is increased while the volume of the gas A1 is remained, the pressure of the gas A1 will increase. Consequently, through adjusting the original pressure of the gas A1, the allowed stroke and the speed of the upper piston 410 will be changed, and the resistance of the shock absorbing can be changed accordingly.

The upper piston assembly 400 can further include a pin 430 movably disposed in the gas channel 410. Hence, the gas A1 can flow into the inner space 230 from the gas channel 450 by moving the pin 430 such that the amount of the gas A1 can be adjusted for changing the pressure as well as the effect of the shock absorbing. In other embodiments, the gas channel can be omitted, and the present disclosure will not be limited thereto.

Furthermore, the upper piston assembly 400 can further include a ring 440 which sleeves the upper piston 410 and is adjacent to the pushing end to assist the upper piston 410 sliding inside the inner tube 200.

Figure 4:
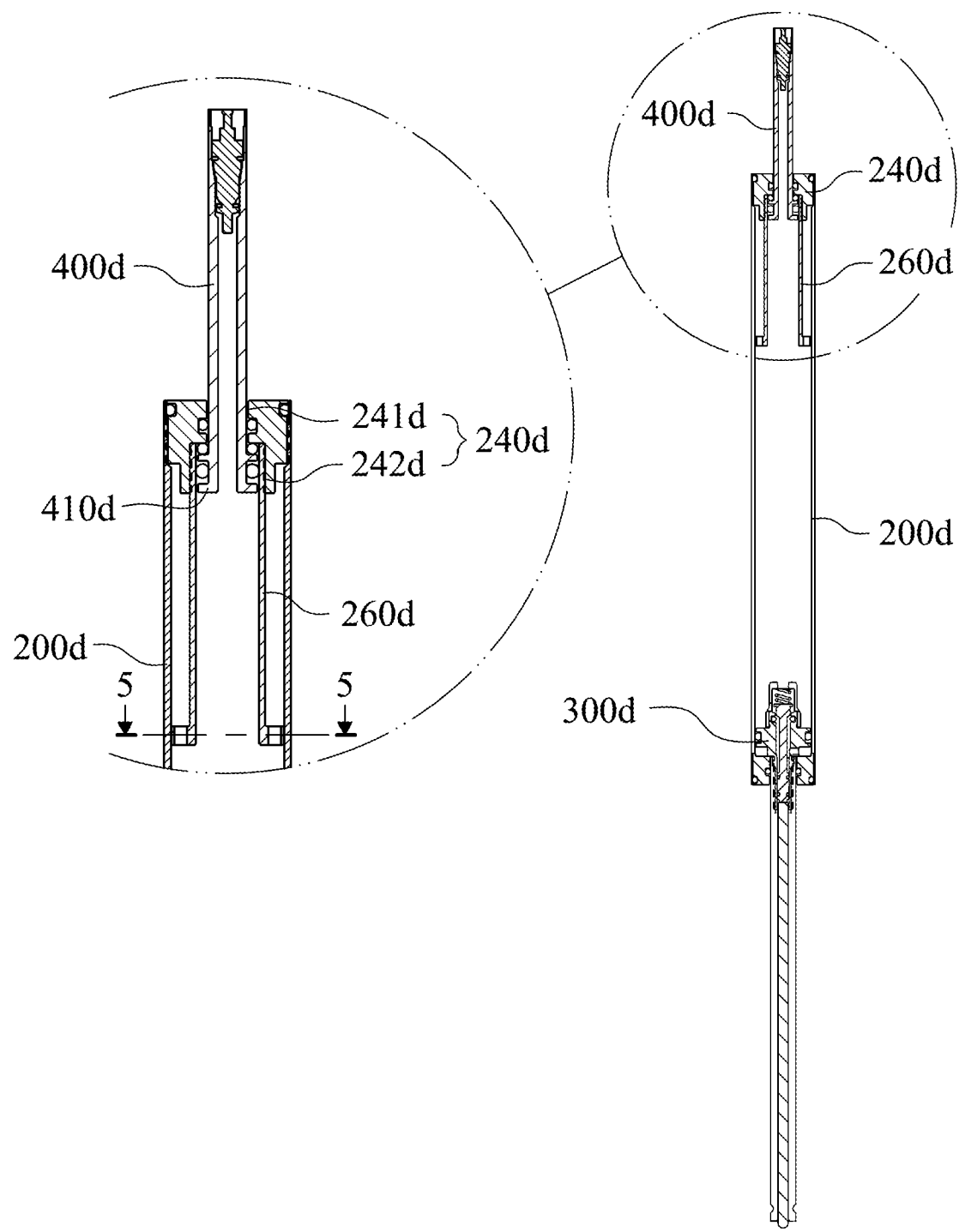
FIG. 4 shows a cross-sectional view of a shock absorbing and height adjusting structure according to a second embodiment of the present disclosure.
Figure 5:
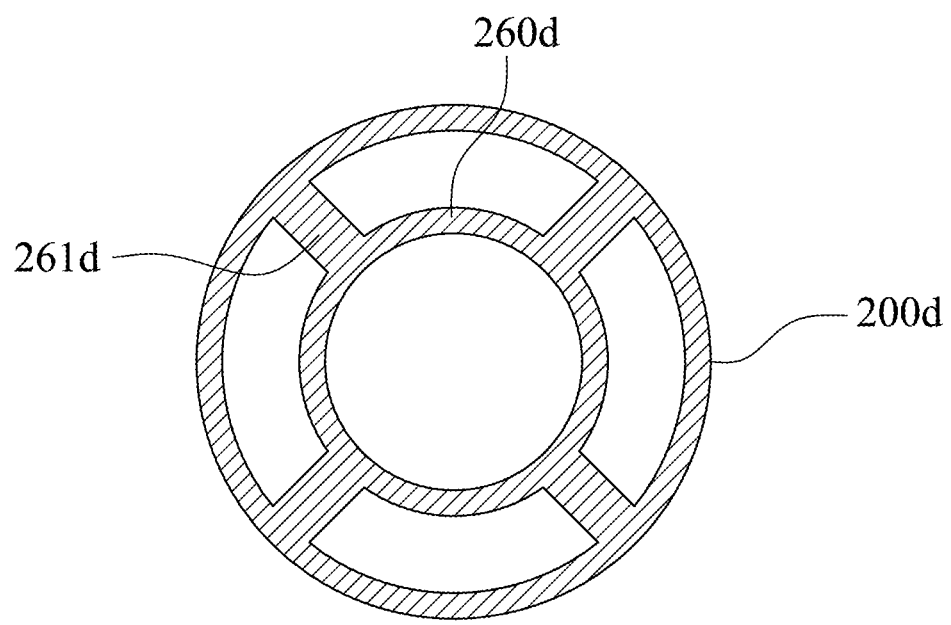
FIG. 5 shows another cross-sectional view of the shock absorbing and height adjusting structure taken along line 5-5 of FIG. 4.

FIG. 4 shows a cross-sectional view of a shock absorbing and height adjusting structure 100d according to a second embodiment of the present disclosure. FIG. 5 shows another cross-sectional view of the shock absorbing and height adjusting structure 100d taken along line 5-5 of FIG. 4. The shock absorbing and height adjusting structure 100d includes an inner tube 200d, a lower piston assembly 300d and an upper piston assembly 400d. The structure of the lower piston assembly 300d is identical to the lower piston assembly 300 of the first embodiment, and the details will not be described again. The inner tube 200d can further include a sleeve tube 260d which is located inside the inner space (not labeled) and is connected to the upper sealing cover 240d. The upper piston 410d is moved relative to the upper end within the sleeve tube 260d.

Precisely, the bore of the upper sealing cover 240d includes a narrow segment 241d and a wide segment 242d communicated with the narrow segment 241d. One end of the sleeve tube 260d is connected to the wide segment 242d. The upper piston 410d passes through the narrow segment 241d to enter the sleeve tube 260d, and a diameter of the upper piston 410d is equal to the inner diameter of the sleeve tube 260d; consequently, when the pushing end is moved relative to the upper end, the gas inside the sleeve tube 260d can be compressed. Hence, through the configuration of the sleeve tube 260d, the contact surface between the pushing end and the gas can be adjusted to change the absorbing capability.

Furthermore, the sleeve tube 260d can include a plurality of radial ribs 261d connected to an inner wall (not labeled) of the inner tube 200d. The radial ribs 261d can be disposed at the other side of the sleeve tube 260d. Through the configuration of the radial ribs 261d, the structure of the sleeve tube 260d is reinforced.

Figure 6:
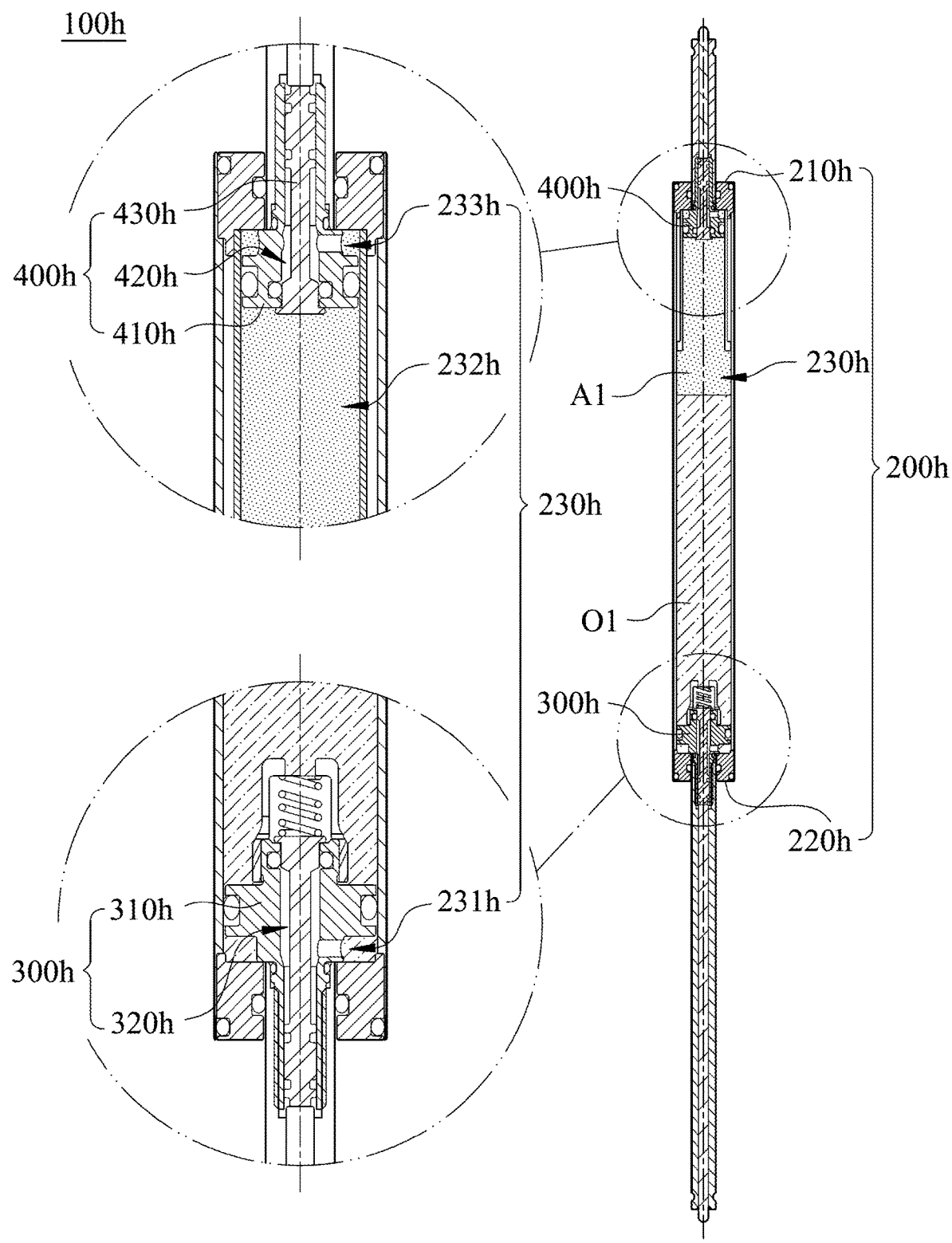
FIG. 6 shows one cross-sectional view of a shock absorbing and height adjusting structure according to a third embodiment of the present disclosure.
Figure 7:
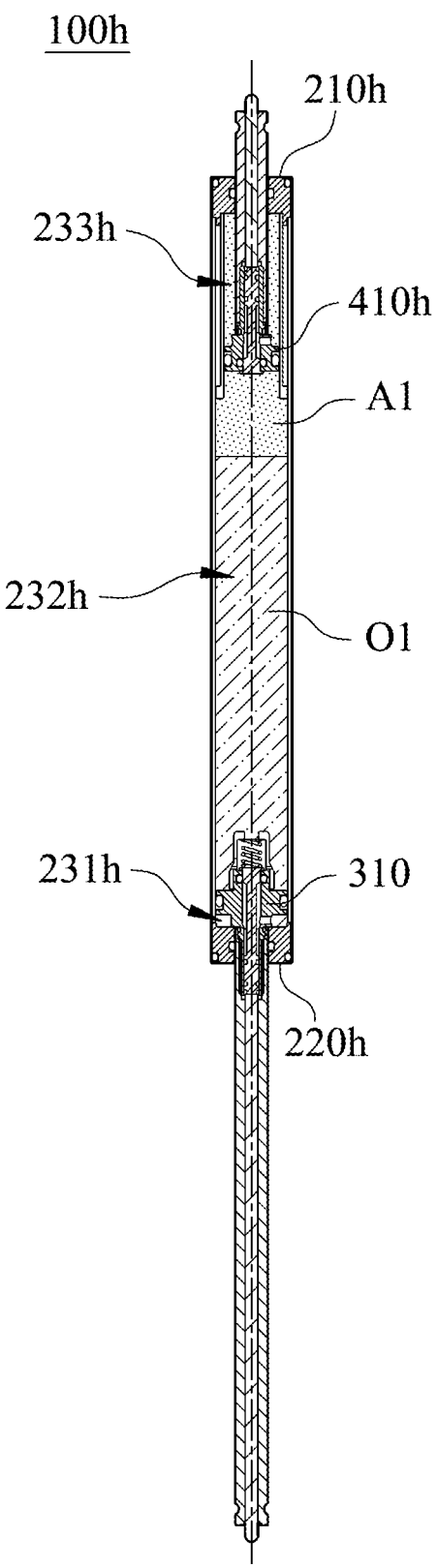
FIG. 7 shows another cross-sectional view of the shock absorbing and height adjusting structure of FIG. 6.
Figure 8:
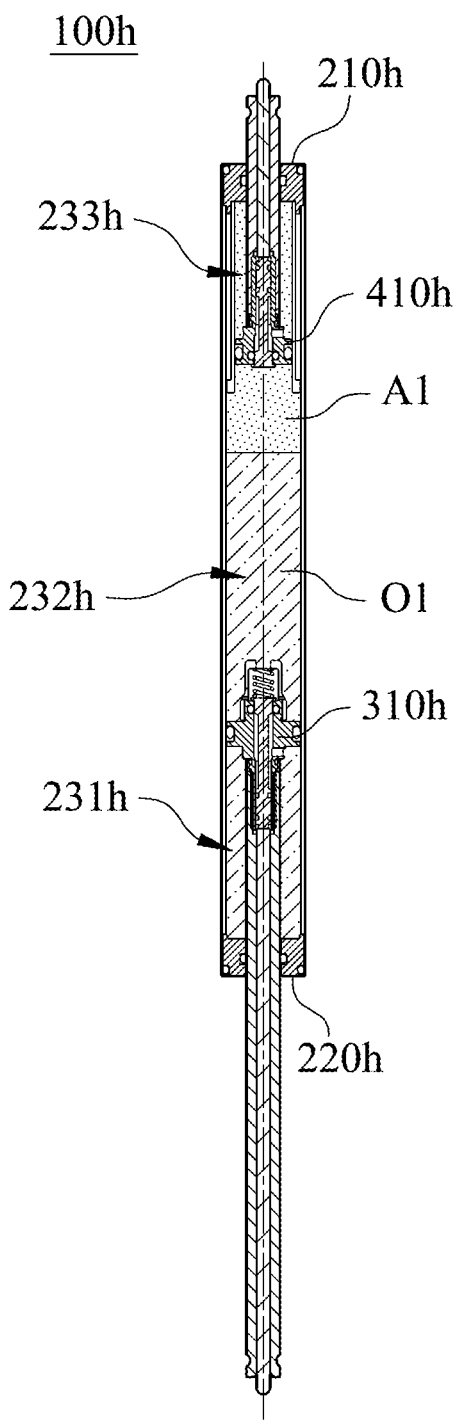
FIG. 8 shows yet another cross-sectional view of the shock absorbing and height adjusting structure of FIG. 6.

FIG. 6 shows one cross-sectional view of a shock absorbing and height adjusting structure 100h according to a third embodiment of the present disclosure. FIG. 7 shows another cross-sectional view of the shock absorbing and height adjusting structure 100h of FIG. 6. FIG. 8 shows yet another cross-sectional view of the shock absorbing and height adjusting structure 100h of FIG. 6. The shock absorbing and height adjusting structure 100h includes an inner tube 200h, a lower piston assembly 300h and an upper piston assembly 400h. The structure of inner tube 200h and the lower piston assembly 300h are identical to the structure of the inner tube 200 and the lower piston assembly 300 of the first embodiment, and the details will not be described again.

The upper piston assembly 400h can further include an upper passage 420h disposed at the upper piston 410h. When the upper passage 420h is opened and the lower passage 310h is closed, the upper piston 410h is moved relative to the upper end 210h while a position of the lower piston 310h relative to the lower end 220h is fixed, and when the lower passage 320h is opened and the upper passage 420h is closed, the lower piston 310h is moved relative to the lower end 220h while a position of the upper piston 410h relative to the upper end 210h is fixed. Therefore, through the configuration of the upper piston assembly 400h and the lower piston assembly 300h, the height adjustment can be split into two steps to achieve a two-stroke adjustment.

The inner space 230h of the inner tube 200h can be separated into a first chamber 231h, a second chamber 232h and a third chamber 233h by the lower piston 310h and the upper piston 410h. The gas A1 is adjacent to the upper end 210h owing to small density. One part of the gas A1 and one part of the oil O1 is accommodated in the second chamber 232h. The other part of the gas A1 is accommodated in the third chamber 233h, and the other part of the oil O1 is accommodated in the first chamber 231h.

The upper piston assembly 400h can further include an upper controlling bar 430h disposed at the upper piston 410h for opening or closing the upper passage 420h. Precisely, the upper controlling bar 430h can be switched between a third position and a fourth position along an axis of the inner tube 200h. When the upper controlling bar 430h is in the third position, the upper passage 420h is closed such that the gas A1 cannot flow from the third chamber 233h to the second chamber 232h or from the second chamber 232h to the third chamber 233h. On the contrary, when the upper controlling bar 430h is in the fourth position, the upper passage 420h is opened such that the gas A1 can flow from the third chamber 233h to the second chamber 232h or from the second chamber 232h to the third chamber 233h.

Hence, as shown in FIG. 7, the upper passage 420h is not closed by the upper controlling bar 430h, and the gas A1 can flow from the second chamber 232h to the third chamber 233h; as a result, the upper piston 410h can be moved relative to the upper end 210h. Meanwhile, since the lower passage 320h of the lower piston 310h is closed, the lower piston 310h will not be moved relative to the lower end 220h. In other words, the position of the lower piston 310h relative to the lower end 220h is fixed. Moreover, when the upper passage 420h is closed by the upper controlling bar 430h, the position of the upper piston 410h relative to the upper end 210h is fixed.

Similarly, the relation between the lower piston 310h and the lower passage 320h is identical to the first embodiment, and the detail will not be described again. As shown in FIG. 8, when the lower piston 310h is moved relative to the lower end 220h, the upper piston 410h will not be moved relative to the upper end 210h owing to that the upper passage 420h of the upper piston assembly 400h is closed, and a position of the upper piston 410h relative to the upper end 210h is fixed. Hence, through the operation of the upper piston 410h, the upper passage 420h, the lower piston 310h and the lower passage 320h, the two-stroke adjustment can be achieved.

Figure 9:
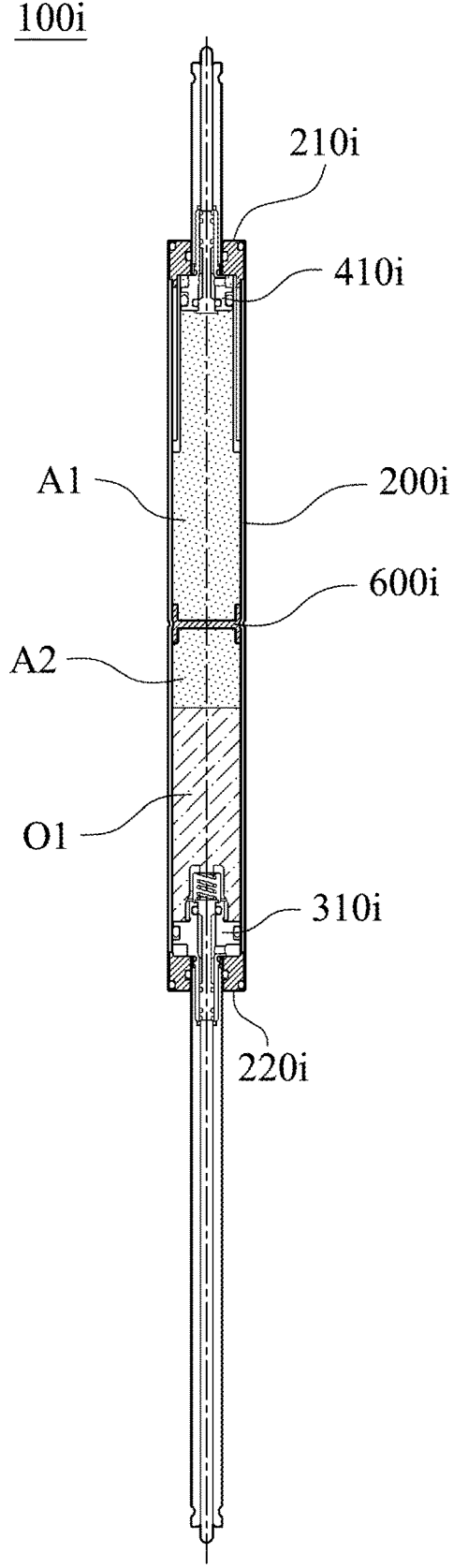
FIG. 9 shows one cross-sectional view of a shock absorbing and height adjusting structure according to a fourth embodiment of the present disclosure.

FIG. 9 shows one cross-sectional view of a shock absorbing and height adjusting structure 100i according to a fourth embodiment of the present disclosure. The shock absorbing and height adjusting structure 100i is similar to the shock absorbing and height adjusting structure 100h of the third embodiment, but the shock absorbing and height adjusting structure 100i can further include a partition 600i. The partition 600i is affixed in the inner tube 200i and is located between the lower piston 310i and the upper piston 410i. The partition 600i is not movable in the inner tube 200i. A gas A1 is accommodated between the partition 600i and the upper end 210i. Another gas A2 and an oil O1 are accommodated between the partition 600i and the lower end 220i. The oil O1 is adjacent to the lower end 220i, and the gas A2 is adjacent to the partition 600i.

Figure 10:
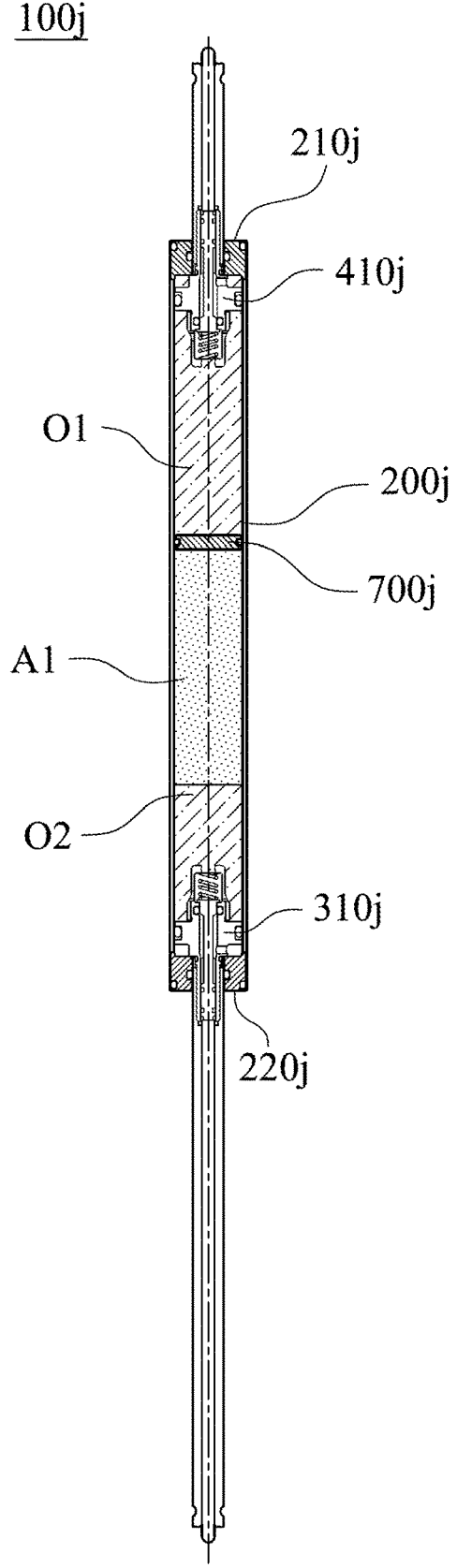
FIG. 10 shows one cross-sectional view of a shock absorbing and height adjusting structure according to a fifth embodiment of the present disclosure.

FIG. 10 shows one cross-sectional view of a shock absorbing and height adjusting structure 100j according to a fifth embodiment of the present disclosure. The shock absorbing and height adjusting structure 100j is similar to the shock absorbing and height adjusting structure 100h of the third embodiment, but the shock absorbing and height adjusting structure 100j can further include a floating piston 700j movable in the inner tube 200j and located between the upper piston 410j and the lower piston 310j. An Oil O1 is accommodated between the floating piston 700j and the upper end 210j. A gas A1 and another oil O2 are accommodated between the floating piston 700j and the lower end 220j, and the gas A1 is adjacent to the floating piston 700j.

Since the floating piston 700j is movable in the inner tube 700j, the pressure inside the inner tube 200j will be automatically adjusted by movement of the floating piston 700j when the upper piston 410j or the lower piston 300j is moved in the inner tube 200j.

Figure 11:
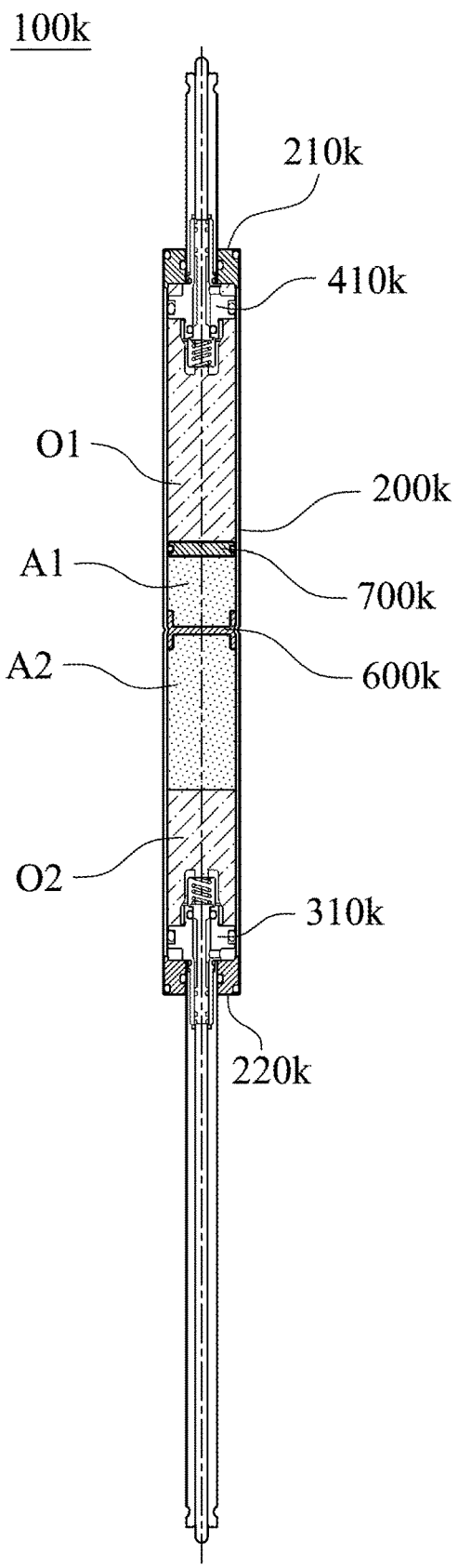
FIG. 11 shows one cross-sectional view of a shock absorbing and height adjusting structure according to a sixth embodiment of the present disclosure.

FIG. 11 shows one cross-sectional view of a shock absorbing and height adjusting structure 100k according to a sixth embodiment of the present disclosure. The shock absorbing and height adjusting structure 100k is similar to the shock absorbing and height adjusting structure 100j of the fifth embodiment, but the shock absorbing and height adjusting structure 100k can further include a partition 600k affixed to the inner tube 200k and located between the lower piston 310k and the floating piston 700k. An oil O1 is accommodated between the floating piston 700k and the upper end 210k. A gas A1 is accommodated between the floating piston 700k and the partition 600k. Another gas A2 and another oil O2 are accommodated between the partition 600k and the lower end 220k, and the gas A2 is adjacent to the partition 600k. The floating piston 700k will be moved in the inner tube 700k according to the pressure of the inner tube 200k affected by the upper piston 410k, and the partition 600k is affixed in the inner tube 200k and will not be moved in the inner tube 200k.

Figure 12:
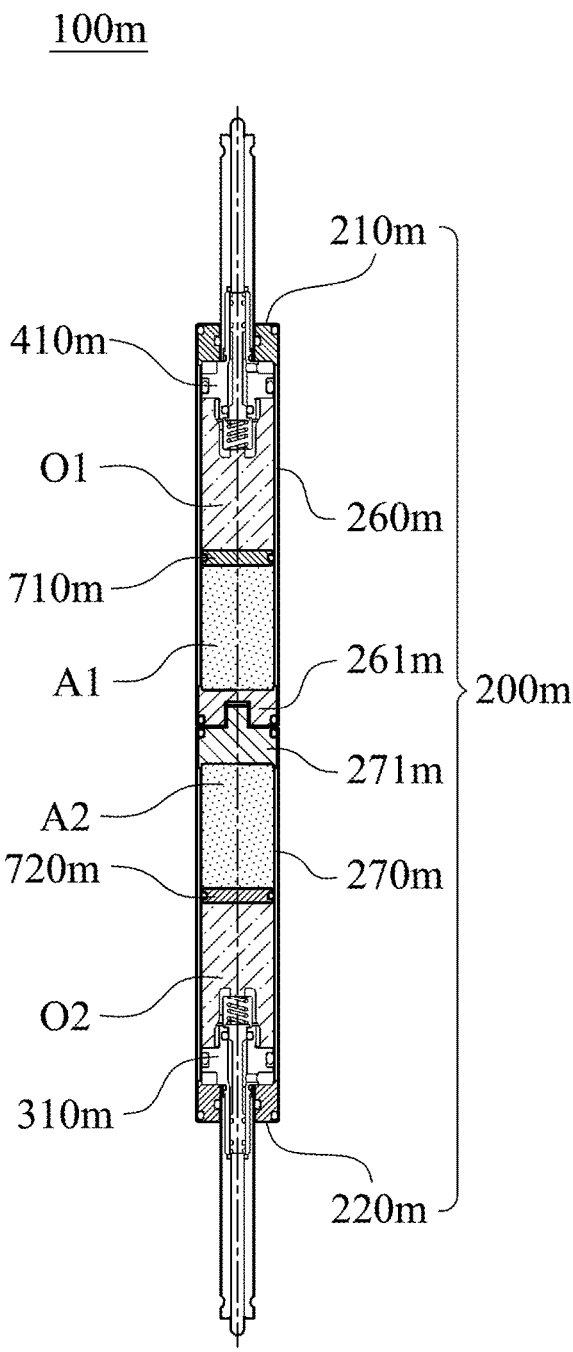
FIG. 12 shows one cross-sectional view of a shock absorbing and height adjusting structure according to a seventh embodiment of the present disclosure.
Figure 13:
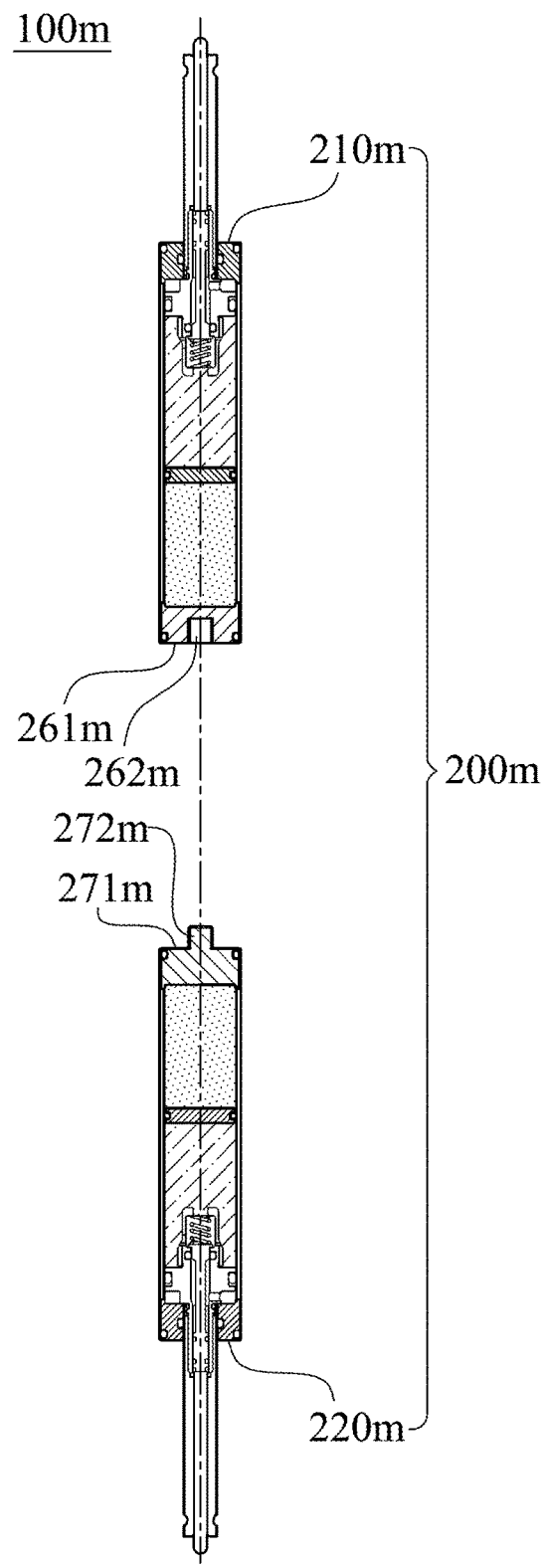
FIG. 13 shows a cross-sectional view of an upper tube body and a lower tube body of the shock absorbing and height adjusting structure separating from each other of FIG. 12.

FIG. 12 shows one cross-sectional view of a shock absorbing and height adjusting structure 100m according to a seventh embodiment of the present disclosure. FIG. 13 shows a cross-sectional view of an upper tube body 260m and a lower tube body 270m of the shock absorbing and height adjusting structure 100m separating from each other of FIG. 12. The shock absorbing and height adjusting structure 100m is similar to the shock absorbing and height adjusting structure 100k of the sixth embodiment, but the difference is that the inner tube 200m include an upper tube body 260m and a lower tube body 270m. The upper tube body 260m includes an upper end 210m and a first connecting end 261m opposite to the upper end 210m. The lower tube body 270m includes a lower end 220m and a second connecting end 271m opposite to the lower end 220m. The second connecting end 271m is connected to the first connecting end 261m. The upper piston 410m is movably inserted into the upper tube body 260m and is adjacent to the upper end 210m. The lower piston 310m is movably inserted into the lower tube body 270m and is adjacent the lower end 220m.

To be more specific, the upper tube body 260m and the lower tube body 270m are independent. Through the connection between the second connecting end 271m and the first connecting end 261m, the upper tube body 260m and the lower tube body 270m are assembled to form the inner tube 200m, and the connected first connecting end 261m and the second connecting end 271m can be deemed as the partition 600k of the sixth embodiment. The upper tube body 260m can include a thread hole 262m located at the first connecting end 261m. The lower tube body 270m can include a thread portion 272m located at the lower connecting end 271m. The thread portion 272m is fastened in the thread hole 262m to connect the upper tube body 260m and the lower tube body 270m. In other embodiments, the upper tube body can include a thread portion and the lower tube body can include a thread hole, or the upper tube body and the lower tube body can include engaging members to engage with each other such that the upper tube body and the lower tube body can be detachably connected.

The shock absorbing and height adjusting structure 100m can include two floating pistons 710m, 720m. The floating piston 710m is movable in the upper tube body 260m, and the floating piston 720m is movable in the lower tube body 270m. In the seventh embodiment, an oil O1 is accommodated between the floating piston 710m and the upper end 210m. A gas A1 is accommodated between the floating piston 710m and the first connecting end 261m. Another gas A2 is accommodated between the floating piston 720m and the second connecting end 271m. Another oil O2 is accommodated between the floating piston 720m and the lower end 220m. The floating piston 710m will be moved in the upper tube body 260m according to the pressure of the upper tube body 260m, and the floating piston 720m will be moved in the lower tube body 270m according to the pressure of the lower tube body 270m.

Figure 14:
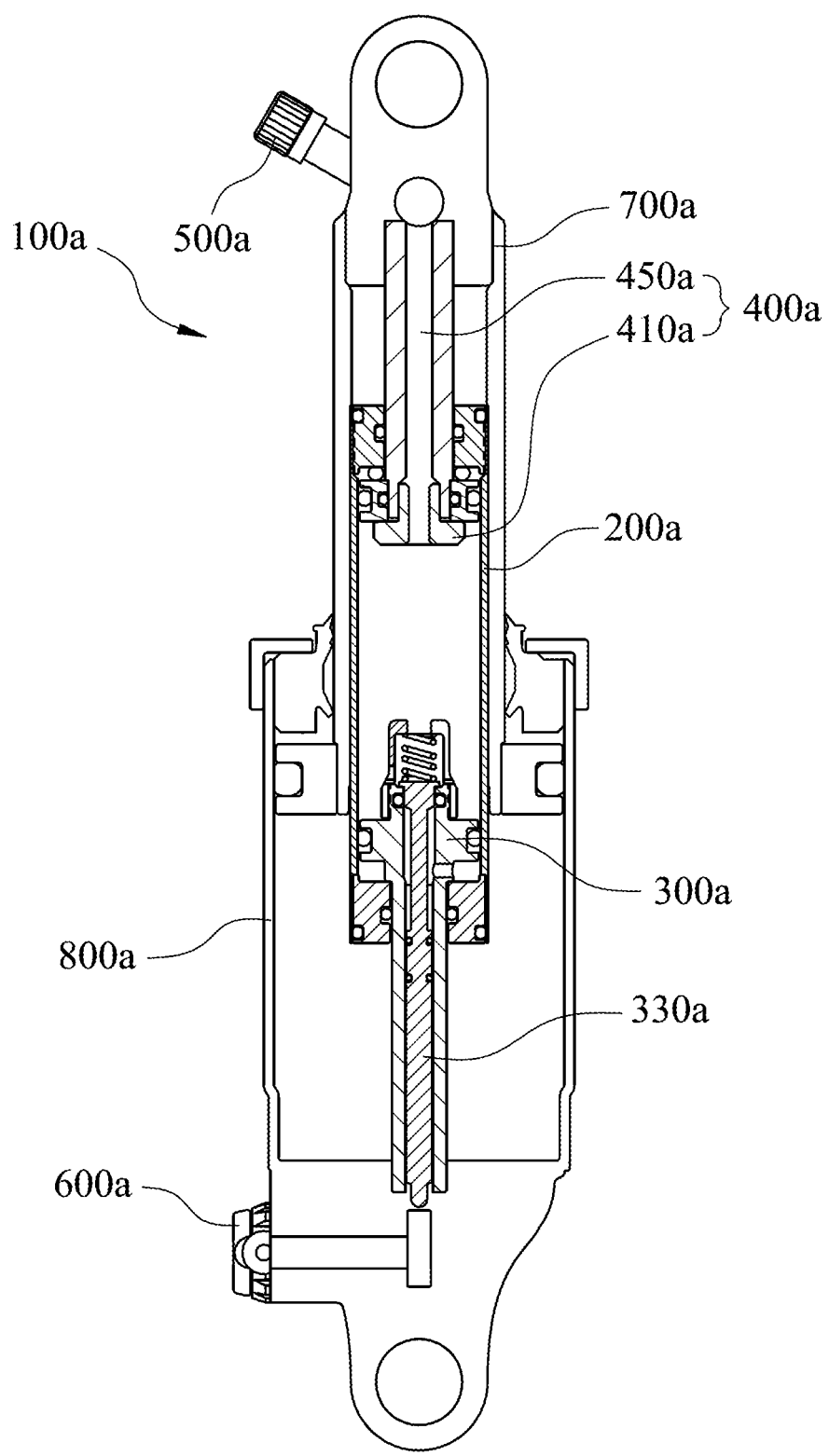
FIG. 14 shows one schematic view of an application of a shock absorbing and height adjusting structure according to an eighth embodiment of the present disclosure.

FIG. 14 shows one schematic view of an application of a shock absorbing and height adjusting structure 100a according to an eighth embodiment of the present disclosure. The shock absorbing and height adjusting structure 100a includes an inner tube 200a, a lower piston assembly 300a, an upper piston assembly 400a, a nozzle 500a and a lower switch 600a. The shock absorbing and height adjusting structure 100a is connected to a top tube 700a and a disposing tube 800a. The structure of inner tube 200a and the lower piston assembly 300a are identical to the structure of the inner tube 200 and the lower piston assembly 300 of the first embodiment. The upper piston assembly 400a is different from the upper piston assembly 400 of the first embodiment, and the difference is that the upper piston assembly 400a does not include a pin. The same or similar structure will not be described again.

The inner tube 200a is movable in the top tube 700a. The upper piston 410a is within the top tube 700a and includes a distal end (not labeled) affixed on the top tube 700a. The top tube 700a is movable in the disposing tube 800a. The lower piston assembly 300a is connected to the disposing tube 800a. The lower switch 600a is exposed from the disposing tube 800a for operation, and the lower controlling bar 330a of the lower piston assembly 300a is linked up with the lower switch 600a. The nozzle 500a is disposed on the top tube 700a and is communicated with the gas channel 450a to allow an external gas to flow therein to adjust the pressure of the gas (not shown) inside the inner space (not labeled) of the inner tube 200a.

A user can operate the lower switch 600a to adjust the relative position between the top tube 700a and the disposing tube 800a. For example, when the top tube 700a is connected to a seat, the height of the seat can be adjusted by operation of the lower switch 600a. When a force, e.g., the force suddenly loaded on the seat caused by the user, is loaded on the top tube 700a, the upper piston 410a will be moved to compress the gas in the inner space to absorb the force owing to the connection relation between the upper but 700a and the upper piston 410a.

Figure 15:
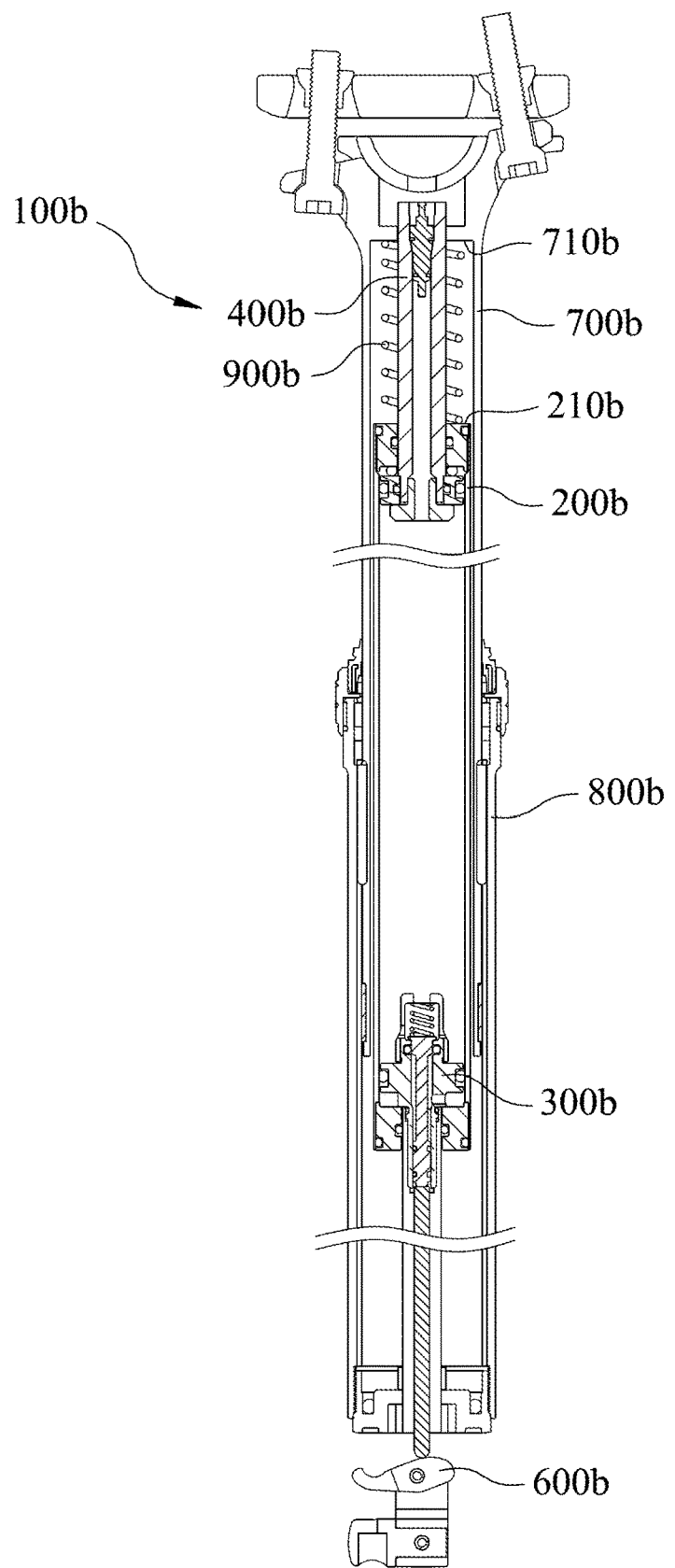
FIG. 15 shows one schematic view of another application of a shock absorbing and height adjusting structure according to a ninth embodiment of the present disclosure.

FIG. 15 shows one schematic view of another application of a shock absorbing and height adjusting structure 100b according to a ninth embodiment of the present disclosure. In FIG. 15, the shock absorbing and height adjusting structure 100b is applied to a bicycle seat tube set. The bicycle seat tube set includes the shock absorbing and height adjusting structure 100b, a seat post 700b and a seat tube 800b. The seat post 700b is inserted in the seat tube 800b, and an interior of the seat post 700b is communicated with an interior of the seat tube 800b to form a receiving space (not labeled). The shock absorbing and height adjusting structure 100b can be disposed within the receiving space and includes an inner tube 200b, a lower piston assembly 300b, an upper piston assembly 400b and a lower switch 600b. The upper piston assembly 400b is connected to the seat post 700b and the lower piston assembly 300b is connected to the seat tube 800b. Hence, when the upper piston assembly 400b or the lower piston assembly 300b is moved in the inner tube 200b, the seat post 700b can be moved relative to the seat tube 800b to adjust the height of a bicycle seat (not shown).

The structure of the inner tube 200b, the lower piston assembly 300b and the upper piston assembly 400b are identical to the structure of the inner tube 200, the lower piston assembly 300 and the upper piston assembly 400 of the first embodiment. The lower switch 600b is linked up with the lower controlling bar of the lower piston assembly 300b to adjust the relative position between the seat post 700b and the seat tube 800b, thereby adjusting a height of the bicycle seat.

The shock absorbing and height adjusting structure 100b can further includes an elastic member 900b located between a top end 710b of the seat post 700b and the upper end 210b of the inner tube 200b for providing a restoring force. Under such structure, the elastic member 900b can be operated with the upper piston assembly 400b simultaneously to achieve a better shock absorbing effect.

Figure 16:
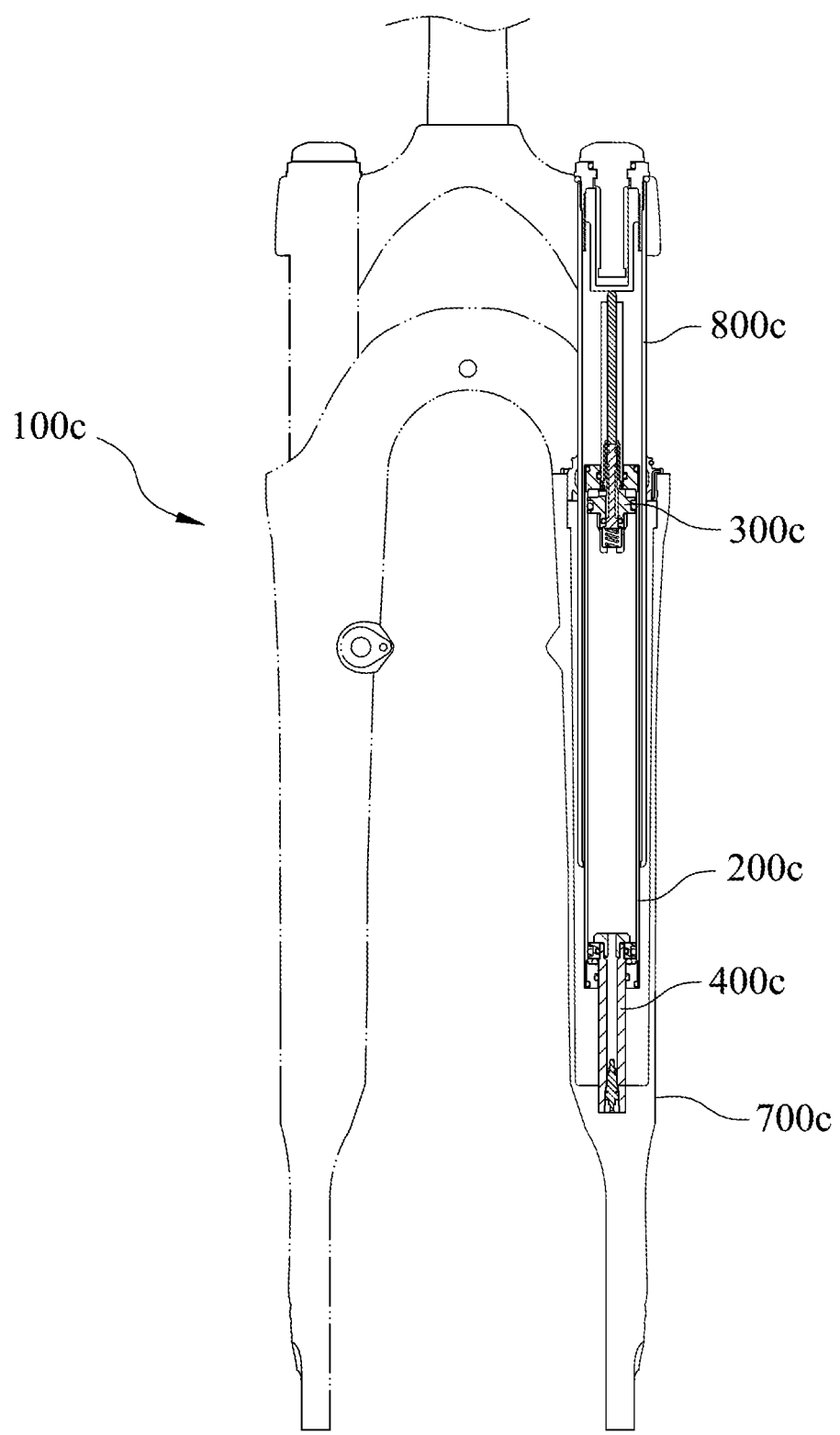
FIG. 16 shows one schematic view of further another application of a shock absorbing and height adjusting structure according to a tenth embodiment of the present disclosure.

FIG. 16 shows one schematic view of further another application of a shock absorbing and height adjusting structure 100c according to a tenth embodiment of the present disclosure. In FIG. 16, the shock absorbing and height adjusting structure 100c is applied to a front fork. The shock absorbing and height adjusting structure 100c includes an inner tube 200c, a lower piston assembly 300c and an upper piston assembly 400c. The shock absorbing and height adjusting structure 100c is connected to a top tube 700c and a disposing tube 800c. The inner tube 200c is movable in the top tube 700c which is connected to the upper piston assembly 400c. The structure of the inner tube 200c, the lower piston assembly 300c and the upper piston assembly 400c are identical to the structure of the inner tube 200, the lower piston assembly 300 and the upper piston assembly 400 of the first embodiment. The disposing tube 800b is disposed between the top tube 700c and the inner tube 200c, and the lower piston assembly 300c is disposed at the disposing tube 800c. Hence, when the upper tube 800c is affected by a wheel and is forced, the top tube 700c can push the upper piston assembly 400c to compress the gas (not shown) inside the inner tube 200c to achieve the shock absorbing effect. Please be noted that the term "upper" and the term "lower" are only used for describing opposite positions, and the operation/application will not be limited by the terms.

Figure 17:
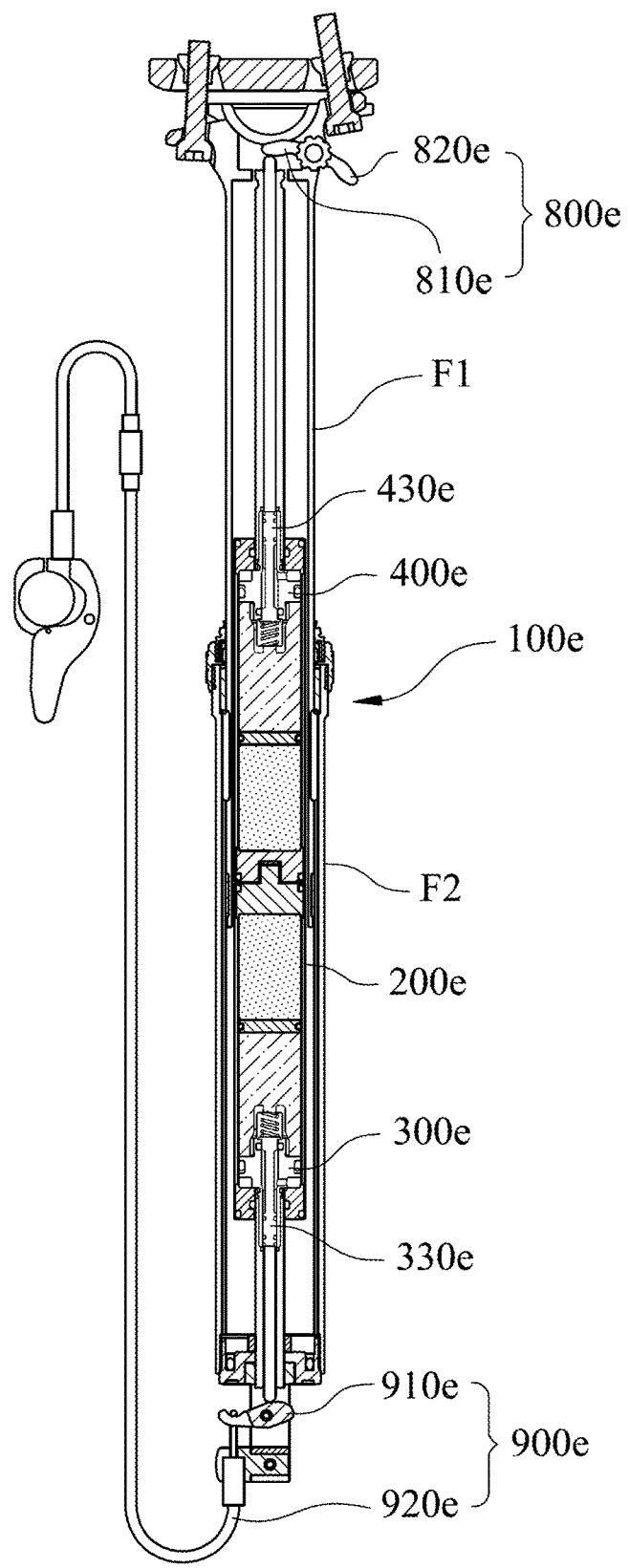
FIG. 17 shows one schematic view of still another application of a shock absorbing and height adjusting structure according to an eleventh embodiment of the present disclosure.

FIG. 17 shows one schematic view of still another application of a shock absorbing and height adjusting structure 100e according to an eleventh embodiment of the present disclosure. In FIG. 17, the shock absorbing and height adjusting structure 100e is applied to a bicycle seat tube set. The bicycle seat tube set includes the shock absorbing and height adjusting structure 100e, a seat post F1 and a seat tube F2. The shock absorbing and height adjusting structure 100e can further include an upper switch 800e for opening or closing the upper passage (not labeled) and a lower switch 900e for opening or closing the lower passage (not labeled). The upper switch 800e includes a first pivotal lever 810e and a swinging lever 820e. The first pivotal lever 810e is pivotally disposed at the seat post F1 and one end thereof selectively pushes the upper controlling bar 430e. The swinging lever 820e is connected to the other end the first pivotal lever 810e. The user can operate the swinging lever 820e to swing the first pivotal lever 810e such that the upper passage can be opened to adjust the height. The lower switch 900e includes a second pivotal lever 910e and a cable 920e.

The second pivotal lever 910e is pivotally disposed at the seat tube F2 and one end thereof selectively pushes the lower controlling bar 330e. The cable 920e is connected to the other end of the second pivotal lever 910e. When the user operates a controlling handle (not labeled), the second pivotal lever 910e can open the lower passage to adjust the height. Since the upper switch 800e and the lower switch 900e can be operated separately and independently, the user can operate the upper switch 800e or the lower switch 900e for two-stroke adjustment. In other embodiments, the upper switch and the lower switch can be directly connected to the upper controlling bar or the lower controlling bar, and the present disclosure will not be limited thereto.

Figure 18:
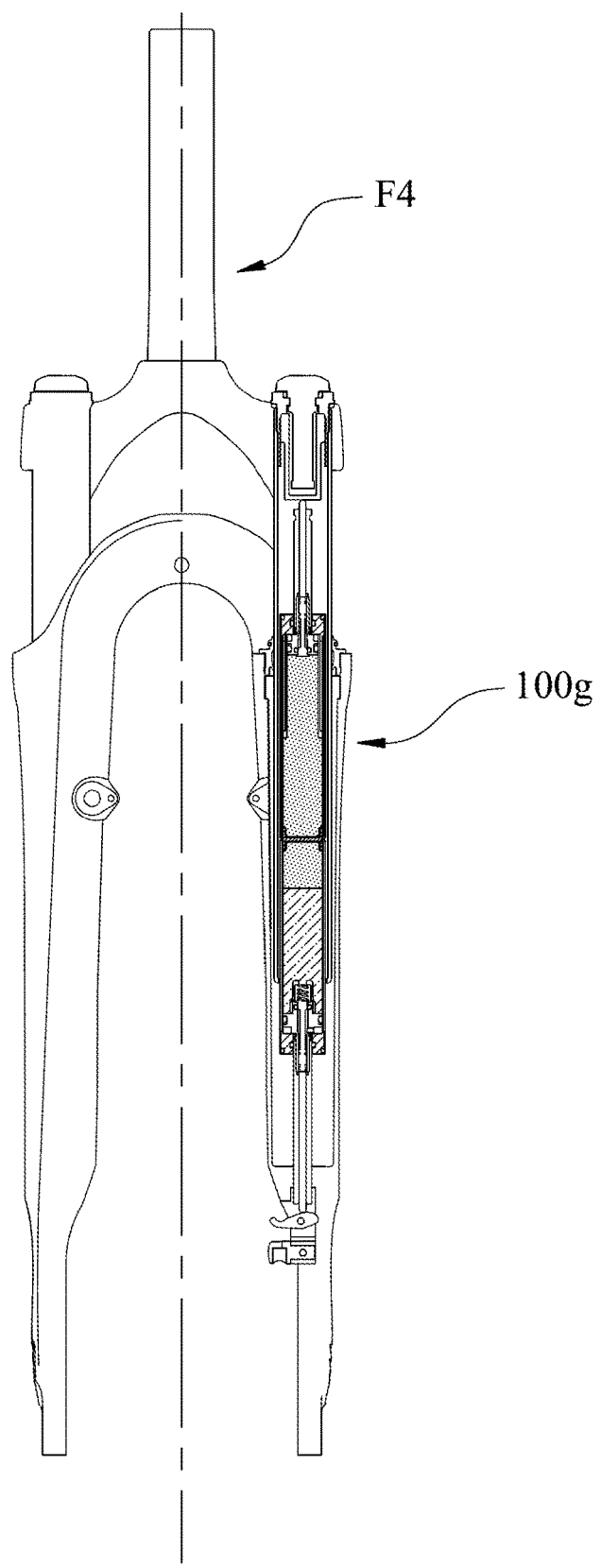
FIG. 18 shows one schematic view of yet another application of a shock absorbing and height adjusting structure according to a twelfth embodiment of the present disclosure.

FIG. 18 shows one schematic view of yet another application of a shock absorbing and height adjusting structure 100g according to a twelfth embodiment of the present disclosure. In FIG. 18, the shock absorbing and height adjusting structure 100g is applied to a front fork F4. Each of two fork tubes of the front fork F4 can include the shock absorbing and height adjusting structure 100g. The shock absorbing and height adjusting structure 100g is identical to the shock absorbing and height adjusting structure 100i of the fourth embodiment, and the details thereof will not be described again.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall inside the scope of the following claims.

What is claimed is:

1. A shock absorbing and height adjusting structure, comprising:
   an inner tube, comprising:
      an upper end;
      a lower end opposite to the upper end; and
      an inner space for accommodating a gas;
   a lower piston assembly, comprising:
      a lower piston movably inserted into the inner tube; and
      a lower passage disposed at the lower piston; and
   an upper piston assembly comprising an upper piston movably inserted into the inner tube;
   wherein when the lower passage is opened, the lower piston is moved relative to the lower end; and when the upper piston is forced, the upper piston is moved relative to the upper end toward the lower end so as to compress the gas.

2. The shock absorbing and height adjusting structure of claim 1, wherein the upper piston assembly further comprises:
   a gas channel located inside the upper piston and communicated with the inner space;
   wherein the gas is allowed to flow through the gas channel so as to adjust an amount of the gas inside the inner space.

3. The shock absorbing and height adjusting structure of claim 2, wherein the upper piston assembly further comprises:
   a pin movably disposed in the gas channel.

4. The shock absorbing and height adjusting structure of claim 2, further comprising:
a nozzle communicated with the gas channel.

5. The shock absorbing and height adjusting structure of claim 1, wherein the inner tube further comprises:
an upper sealing cover covered on the upper end of the inner tube and having a bore configured to allow the upper piston to insert into the inner space; and
a lower sealing cover covered on the lower end of the inner tube and having a bore configured to allow the lower piston to insert into the inner space.

6. The shock absorbing and height adjusting structure of claim 5, wherein the inner tube further comprises:
a sleeve tube located inside the inner space and connected to the upper sealing cover;
wherein the upper piston is moved relative to the upper end within the sleeve tube.

7. The shock absorbing and height adjusting structure of claim 6, wherein the sleeve tube comprises:
a plurality of radial ribs connected to an inner wall of the inner tube.

8. The shock absorbing and height adjusting structure of claim 1, wherein the upper piston assembly further comprises:
an upper passage disposed at the upper piston;
wherein when the upper passage is opened and the lower passage is closed, the upper piston is moved relative to the upper end while a position of the lower piston relative to the lower end is fixed, and when the lower passage is opened and the upper passage is closed, the lower piston is moved relative to the lower end while a position of the upper piston relative to the upper end is fixed.

9. The shock absorbing and height adjusting structure of claim 8, further comprising:
a floating piston movably disposed in the inner tube and located between the upper piston and the lower piston.

10. The shock absorbing and height adjusting structure of claim 9, wherein an oil is accommodated between the floating piston and the upper end, the gas and another oil are accommodated between the floating piston and the lower end, and the gas is adjacent to the floating piston.

11. The shock absorbing and height adjusting structure of claim 9, further comprising:
a partition fixed in the inner tube and located between the lower piston and the floating piston;
wherein an oil is accommodated between the floating piston and the upper end, the gas is accommodated between the floating piston and the partition, and another gas and another oil are accommodated between the partition and the lower end.

12. The shock absorbing and height adjusting structure of claim 8, wherein an oil is accommodated in the inner tube, and the oil is adjacent to the lower end.

13. The shock absorbing and height adjusting structure of claim 8, further comprising:
a partition fixed in the inner tube and located between the lower piston and the upper piston;
wherein the gas is accommodated between the partition and the upper end, another gas and an oil are accommodated between the partition and the lower end, and the oil is adjacent to the lower end.

14. The shock absorbing and height adjusting structure of claim 8, further comprising:
an upper switch for opening or closing the upper passage; and
a lower switch for opening or closing the lower passage.

15. A shock absorbing and height adjusting structure, comprising:
an inner tube, comprising:
an upper tube body, comprising an upper end and a first connecting end opposite to the upper end; and
a lower tube body, comprising a lower end and a second connecting end opposite to the lower end, wherein the second connecting end is connected to the first connecting end;
an upper piston assembly, comprising:
an upper piston movably inserted into the upper tube body and adjacent to the upper end; and
an upper passage disposed at the upper piston; and
a lower piston assembly, comprising:
a lower piston movably inserted into the lower tube body and adjacent the lower end; and
a lower passage disposed at the lower piston;
wherein when the upper passage is opened and the lower passage is closed, the upper piston is moved relative to the upper end while a position of the lower piston relative to the lower end is fixed; when the lower passage is opened and the upper passage is closed, the lower piston is moved relative to the lower end while a position of the upper piston relative to the upper end is fixed; and when the upper piston is forced, the upper piston is moved relative to the upper end toward the lower end so as to compress a gas.

16. The shock absorbing and height adjusting structure of claim 15, further comprising:
an upper switch for opening or closing the upper passage; and
a lower switch for opening or closing the lower passage.

* * * * *